US012638618B2

(12) United States Patent
Chien et al.

(10) Patent No.: US 12,638,618 B2
(45) Date of Patent: May 26, 2026

(54) OPTICAL CONSTRUCTION

(71) Applicant: 3M INNOVATIVE PROPERTIES COMPANY, St. Paul, MN (US)

(72) Inventors: Bert T. Chien, St. Paul, MN (US); William B. Kolb, Stillwater, MN (US); Tri D. Pham, Woodbury, MN (US); Daoyun Song, Woodbury, MN (US); Daniel K. Bruesewitz, New Richmond, WI (US); Stephen P. Maki, North St. Paul, MN (US); James A. Phipps, River Falls, WI (US); Jonah Shaver, Saint Paul, MN (US); Zhaohui Yang, North Oaks, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 276 days.

(21) Appl. No.: 18/279,267

(22) PCT Filed: Mar. 10, 2022

(86) PCT No.: PCT/IB2022/052176
§ 371 (c)(1),
(2) Date: Aug. 29, 2023

(87) PCT Pub. No.: WO2022/195414
PCT Pub. Date: Sep. 22, 2022

(65) Prior Publication Data
US 2024/0168204 A1 May 23, 2024

Related U.S. Application Data

(60) Provisional application No. 63/200,572, filed on Mar. 16, 2021.

(51) Int. Cl.
*G02B 5/28* (2006.01)
*G02B 5/00* (2006.01)
*G06F 3/042* (2006.01)

(52) U.S. Cl.
CPC ............. *G02B 5/005* (2013.01); *G02B 5/003* (2013.01); *G06F 3/0421* (2013.01); *G02B 2207/123* (2013.01)

(58) Field of Classification Search
CPC .. G02B 5/005; G02B 5/003; G02B 2207/123; G02B 5/00; G02B 5/28; G06F 3/0421; G06F 3/042
See application file for complete search history.

(56) References Cited

U.S. PATENT DOCUMENTS 5,949,506 A    9/1999  Jones et al.
2005/0128582 A1  6/2005  Gibilini
(Continued)

FOREIGN PATENT DOCUMENTS

WO    199950710 A1    10/1999
WO    2020035768 A1    2/2020

*Primary Examiner* — Balram T Parbadia
(74) *Attorney, Agent, or Firm* — Jonathan L. Tolstedt

(57) ABSTRACT

An optical construction includes a lens film having a plurality of optically transparent first beads at least partially embedded in a first layer. A light blocking second layer is disposed on the lens film and defines a plurality of through openings therein extending at least partially between opposite major top and bottom surfaces of the second layer. The through openings are aligned to the first beads in a one-to-one correspondence.

5 Claims, 19 Drawing Sheets

(56)                    References Cited

U.S. PATENT DOCUMENTS

2012/0133618 A1*   5/2012  Usukura  ................. G06F 3/042
                                                       345/175
2012/0133624 A1*   5/2012  Castagner  ............. H10F 39/198
                                                       345/207
2016/0054175 A1    2/2016  Jia et al.
2017/0357840 A1*  12/2017  Chen  ...................... G02B 5/201
2020/0019746 A1*   1/2020  Fan  ...................... G06V 10/147
2020/0065547 A1    2/2020  Ryu et al.
2020/0117293 A1*   4/2020  Yang  .................... G06F 3/0443
2020/0292741 A1*   9/2020  Rhee  ................... G02B 5/0294

* cited by examiner 10.0μm

OPTICAL CONSTRUCTION

CROSS REFERENCE TO RELATED APPLICATIONS

This application is a national stage filing under 35 U.S.C. 371 of PCT/IB2022/052176, filed Mar. 10, 2022, which claims the benefit of U.S. Provisional Application No. 63/200,572, filed Mar. 16, 2021, the disclosure of which is incorporated by reference in its/their entirety herein.

TECHNICAL FIELD

The disclosure generally relates to optical constructions and optical systems having optical constructions and optical sensors.

BACKGROUND

Touch screen sensors detect the location of an object (for example a finger or a conductive pen, such as stylus) applied to the surface of a touch screen display or the location of an object positioned near the surface of a touch screen display. These sensors detect the location of the object along the surface of the display, for example in the plane of a flat rectangular display. Examples of touch screen sensors include capacitive sensors, resistive sensors, and projected capacitive sensors. Such sensors include transparent conductive elements that overlay the display.

SUMMARY

Some aspects of the disclosure relate to an optical construction including a lens film having a plurality of optically transparent first beads at least partially embedded in a first layer. A light blocking second layer is disposed on the lens film and defines a plurality of through openings therein extending at least partially between opposite major top and bottom surfaces of the second layer, the through openings aligned to the first beads in a one-to-one correspondence.

Some other aspects of the disclosure relate to an optical construction including a first layer having a plurality of optically transparent first beads at least partially embedded therein. Bottom-most portions of the first beads are disposed at, or proximate to, a major bottom surface, opposite a major top surface, of the first layer. The bottom-most portions of the first beads and the major bottom surface define a plurality of contact or near contact regions therebetween. A light blocking second layer is disposed on the major bottom surface side of the first layer and defines a plurality of through openings therein extending between opposite major top and bottom surfaces of the second layer. The through openings align to the contact or near contact regions in a one-to-one correspondence.

Other aspects of the disclosure relate to an optical system including a light blocking layer defining a plurality of openings therein. For substantially normally incident light having a first wavelength in a predetermined wavelength range, a total optical transmittance of the light blocking layer at the openings is T1 and a total optical transmittance of the light blocking layer in regions between the openings is T2, $T1/T2 \geq 10$. A plurality of beads are arranged substantially in a monolayer of beads along orthogonal first and second in-plane directions of the monolayer of the beads. The monolayer of the beads is disposed on and spaced apart from the light blocking layer such that top-most portions of the beads face away from the light blocking layer and bottom-most portions of the beads face the light blocking layer. Each opening in the plurality of openings is aligned with the bottom-most portion of a different corresponding bead in the monolayer of the beads along substantially a same first direction.

Some other aspects of the disclosure relate to an optical construction including a first layer including opposing major top and bottom surfaces. The major top surface defines a plurality of depressions therein. The depressions are configured to receive a plurality of optically transparent corresponding beads therein. A light blocking second layer is disposed on the major bottom surface opposite the major top surface, opposite the depressions.

Some other aspects of the disclosure relate to an optical system configured to sense a presence of a finger of a user of the optical system. The optical system includes a display configured to display an image for viewing by the user. An optical sensor is configured to detect light reflected by the finger of the user. A beaded film is disposed between the display and the optical sensor and includes a plurality of optically transparent first beads partially embedded in a light absorbing first layer so as to define a plurality of corresponding protrusions on a major top surface of the first layer facing the display. Bottoms of the first beads are disposed at, or proximate to, a major bottom surface, opposite the major top surface, of the light absorbing first layer. For substantially collimated substantially normally incident light having a first wavelength in a predetermined wavelength range, a total optical transmittance of the beaded film is Ta when the incident light is incident on the protrusions side of the beaded film and Tb when the incident light is incident on the major bottom surface side of the beaded film, $Ta/Tb \geq 1.5$.

Other embodiments relate to an optical system configured to sense a presence of a finger of a user of the optical system. The optical system includes the optical construction of one or more aspects of the disclosure, a display configured to display an image for viewing by the user and disposed on the lens film side of the optical construction, and an optical sensor configured to detect light reflected by the finger of the user and disposed on the second layer side of the optical construction.

BRIEF DESCRIPTION OF DRAWINGS

The various aspects of the disclosure will be discussed in greater detail with reference to the accompanying figures where, FIG. 1 schematically shows an optical system including an optical construction according to some embodiments.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Optical systems have advanced significantly and is being extensively used in many applications. The control of angular light distribution in optical systems is important. For example, in the display privacy film application, black louver film is commonly used to only allow axial display light to go through. In another example, in the optical spectral sensor applications, the input light is commonly collimated for better spectral resolution. An area that has attracted a lot of attention is fingerprint sensing behind a display panel. In such applications, an optical sensor is attached to the back side of a semi-transparent display panel for fingerprint imaging. The optical image of the fingerprint may be blurred without proper imaging optics through the imaging distance of the display-panel thickness. Embodiments of this disclosure address these and other challenges.

Some embodiments of the disclosure relate to an angular light control film having closely packed pseudo-random microlens film of high exposure ratio (i.e. near full hemisphere) at the front of a light-blocking layer. The microlens array may be generated by the coating of a closely packed monolayer of spherical polymeric beads of uniform size through a self-assembly monolayer bead coating process. A pinhole array may be subsequently formed into the light-blocking layer by laser processing using the microlenses.

Figure 1:
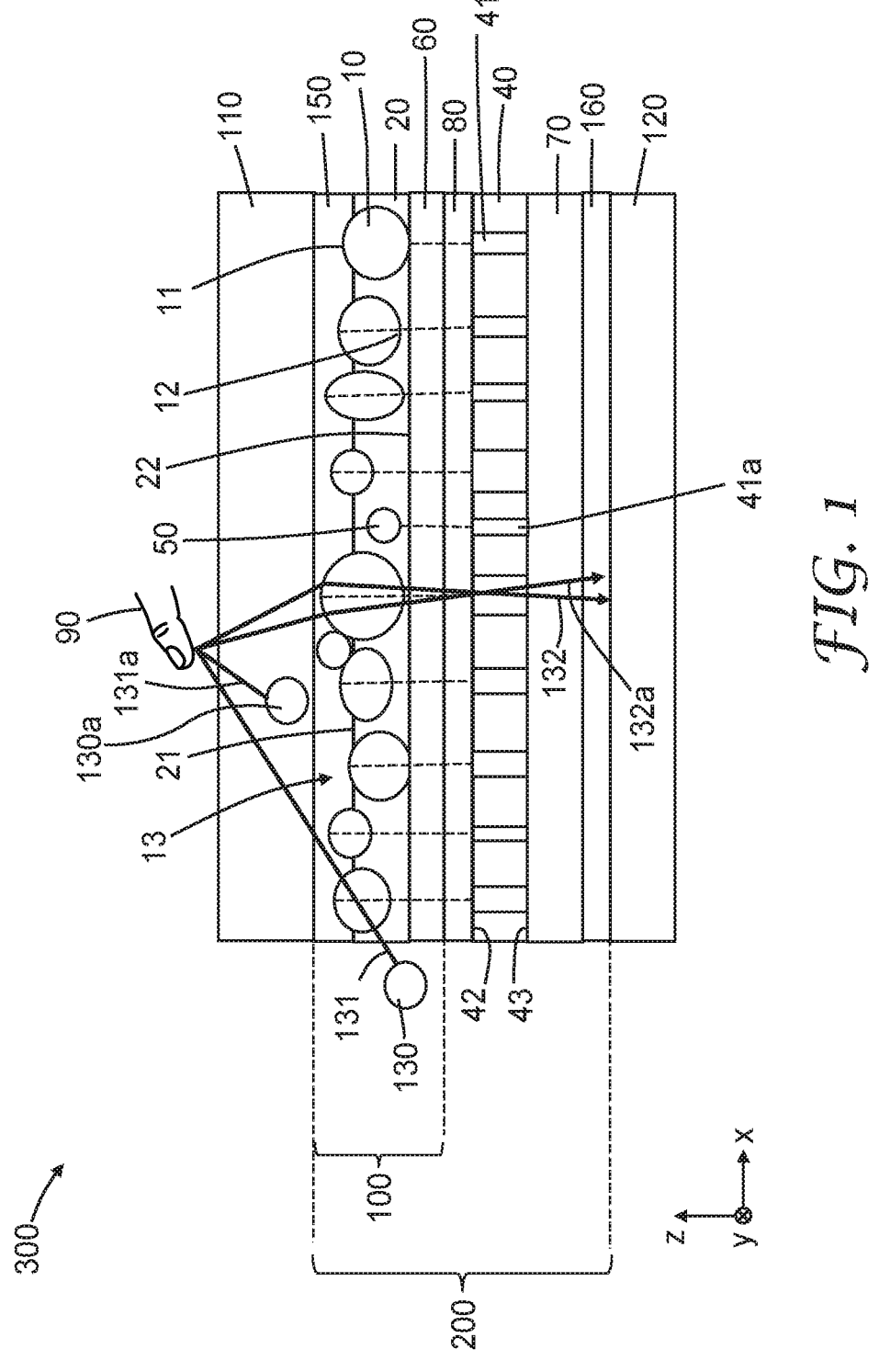

Some embodiments of an optical system (300) including an optical construction (200) are illustrated in FIG. 1. The optical system (300) is configured to sense a presence of a finger (90) of a user of the optical system. The optical system includes a display (110) configured to display an image for viewing by the user and an optical sensor (120) configured to detect light (132) reflected by the finger (90) of the user. For instance, a light source (130, 130a) may be configured to emit light (131, 131a), the emitted light is reflected (132, 132a) by the finger (90) of the user and the reflected light is detected by the optical sensor (120). In some aspects, the light source (130) may be disposed on a lateral side of the optical construction (200). In other aspects, the light source (130a) may be disposed inside the display (110).

Figure 4:
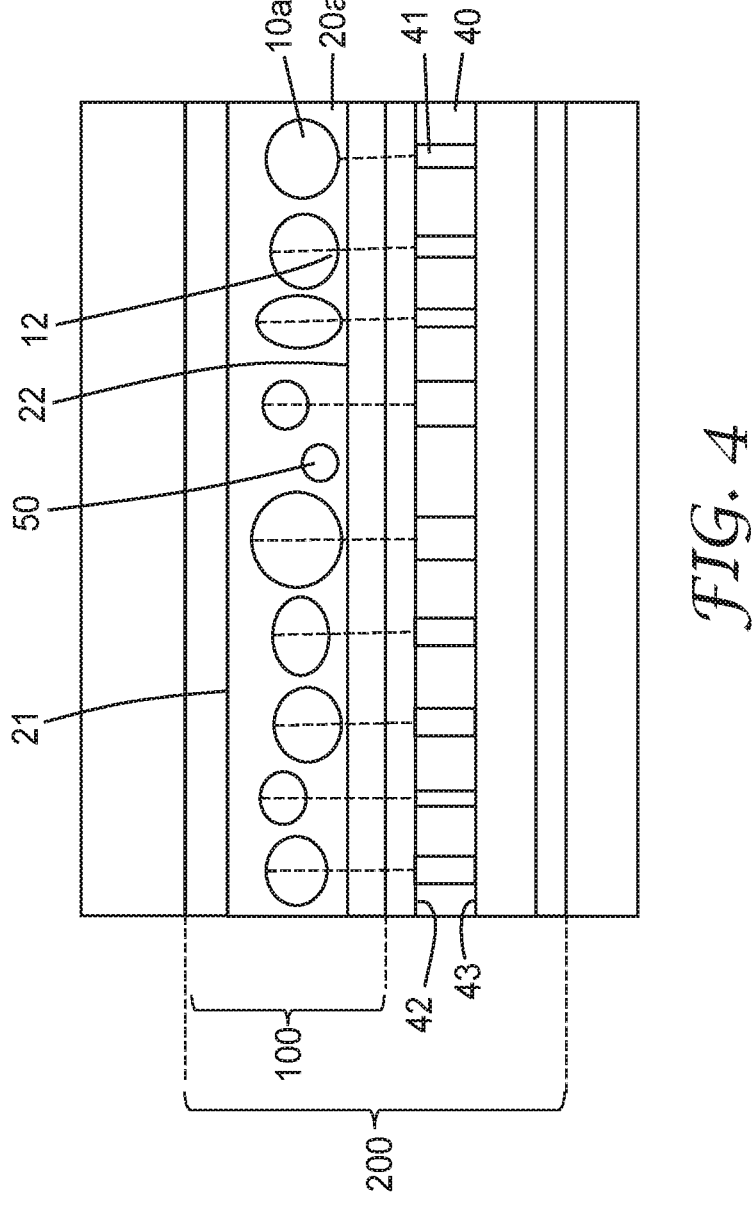
FIG. 4 schematically shows an optical construction having optically transparent beads according to some embodiments.

In some embodiments, an optically diffusive film (100) may be disposed between the display (110) and the optical sensor (120). In some embodiments, the optically diffusive film may be a beaded film made from the self-assembly of particles (e.g., microparticles having an average size of about 2 microns to about 50 microns). In some embodiments of this disclosure, the optically diffusive film (100) may be a lens film having a plurality of optically transparent first beads (10) at least partially embedded in a first layer (20). In some aspects, one or more of the first beads (10a) may be completely embedded in the first layer (20a) as best shown in FIG. 4. The optical construction (200) of the optical system (300) may include the optically diffusive film (100) and a light blocking second layer (40) disposed on the film (100). The optical system (300) may be configured such that the display (110) is disposed on the lens film side of the optical construction and the optical sensor (120) is disposed on the light blocking second layer side of the optical construction. In some aspects, a first bonding layer (80) of the optical construction (200) may bond the first layer (20) to the light blocking second layer (40).

In some aspects, the first layer (20) may be optically transparent having an average optical density of less than about 0.25, or less than 0.1, or less than 0.05 in a visible wavelength range extending from about 420 nm to about 680 nm.

In some other aspects, the first layer may be optically absorbing having an average optical density of greater than about 0.2, or greater than about 0.5, or greater than about 1, or greater than about 1.5, or greater than about 2, or greater than about 2.5, or greater than about 3 in a visible wavelength range extending from about 420 nm to about 680 nm. The optically absorbing first layer may include one or more of a light absorbing pigment, a light absorbing dye and carbon black, and, in some embodiments, may include a black or dark gray color. In some aspects, the first layer may further include light absorbing elements that absorb in the spectral range of 350 nm to 425 nm to block UV light. In other aspects, the first layer may also include light absorbing elements that absorb in the spectral rang of 680 nm to 1200 nm to block NIR light.

In some aspects, the light blocking second layer (40) disposed on the lens film may define a plurality of through openings (41) extending between opposite major top (42) and bottom (43) surfaces of the second layer (40). The through openings (41) may align to the first beads (10) in a one-to-one correspondence. At least one of the through openings in the plurality of through openings (41) may be formed by removing a portion of the second layer (40) corresponding to the through opening. In some other aspects, at least one of the through openings in the plurality of through openings (41) may be formed by making a first portion of the second layer (40) corresponding to the through optical opening more optically transmissive than a second portion of the second layer (40) adjacent to the through optical opening. An average size of the through openings in the plurality of through openings may be between about 0.5 microns and about 7 microns. In some instances, the average size of the through openings may be between about 1 micron and about 8 microns, or between about 1.5 microns and about 9 microns, or between about 2 microns and about 10 microns.

In some embodiments, a ratio of an average size of the through openings (41) in the plurality of through openings to an average size of the first beads (10) in the plurality of optically transparent first beads may be less than about 0.75, or less than about 0.6, or less than about 0.5, or less than about 0.4, or less than about 0.3, or less than about 0.2, or less than about 0.1.

Figure 3:
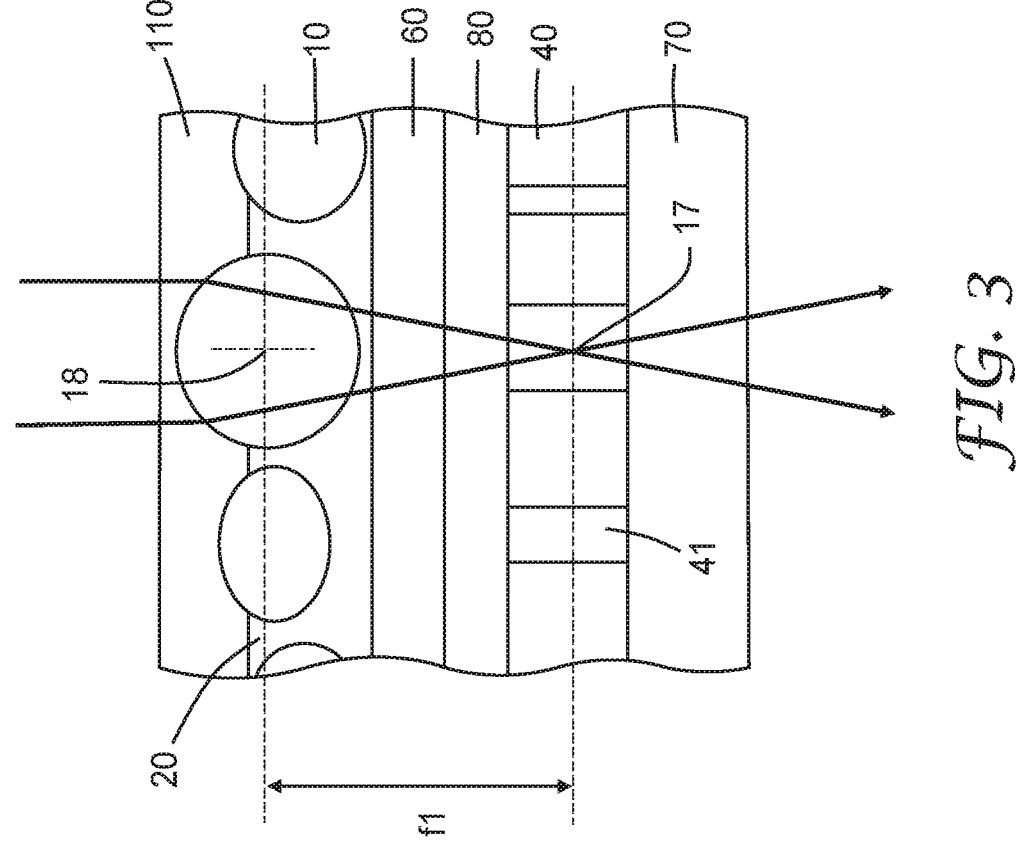
FIG. 3 schematically shows the focal lengths and focal points of optically transparent beads according to some embodiments.

In some aspects, as shown in FIG. 3, focal points (17) of the first beads (10) may be at or near the through openings (41). The focal lengths (f1) of the first beads (10) may be approximately equal to separation distance between centers (18) of the first beads and the through openings (41). In some aspects, the thicknesses of each intervening element between first beads (10) and through openings (41) may be adjusted or designed to set the distance to equal the focal length (f1) of the first beads.

Figures 9, 10:
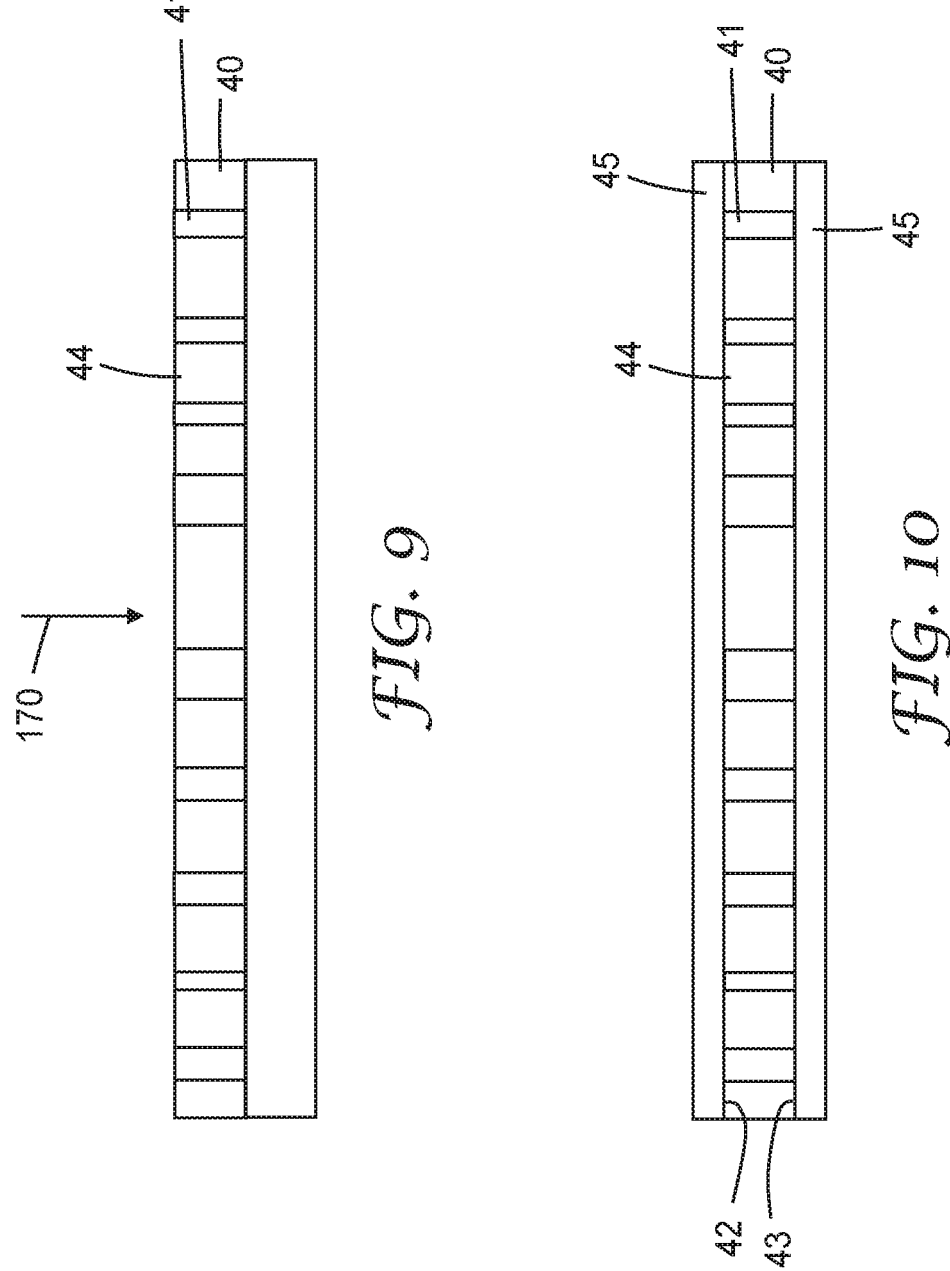
FIGS. 9 & 10 schematically show a light blocking layer of an optical construction with light substantially normally incident on the film.

The light blocking second layer (40) may be provided to block at least a portion of the ambient light that falls on the portion of the light blocking second layer (40) outside of the openings (41). Such blocking of ambient light can increase the contrast of display (110). In some embodiments, the light blocking second layer (40) may include a metal. In other cases, the light blocking second layer (40) may include an anti-reflection coating (45) on one or both of each major surface (42, 43) thereof, as best seen in FIG. 10.

In some embodiments, the first beads (10) in the plurality of optically transparent first beads may have an average size in a range from about 2 microns to about 50 microns. In some other instances, the average size of the first beads may be in the range from about 3 microns to about 45 microns, or from about 4 microns to about 40 microns, or from about 5 microns to about 35 microns, or from about 7 microns to about 30 microns, or from about 10 microns to about 25 microns, or from about 15 microns to about 20 microns. In some aspects, for at least one visible wavelength in a visible wavelength range extending from about 420 nm to about 680 nm, the first beads in the plurality of optically transparent first beads (10) may have an index of refraction in a range from about 1.41 to about 1.6. In other instances, the index of refraction of the first beads (10) may be in a range from about 1.42 to about 1.7, or about 1.43 to about 1.8, or about 1.45 to about 2, or about 1.47 to about 2.2, or about 1.49 to about 2.3, or about 1.5 to about 2.4, or about 1.52 to about 2.5. In some other embodiments, the first beads (10) in the plurality of optically transparent first beads may be substantially spherical.

In some aspects, at least some of the first beads (10) in the plurality of optically transparent first beads may include one or more of polymeric beads, glass beads, silicone beads, ceramic beads, and plastic beads.

Figure 14:
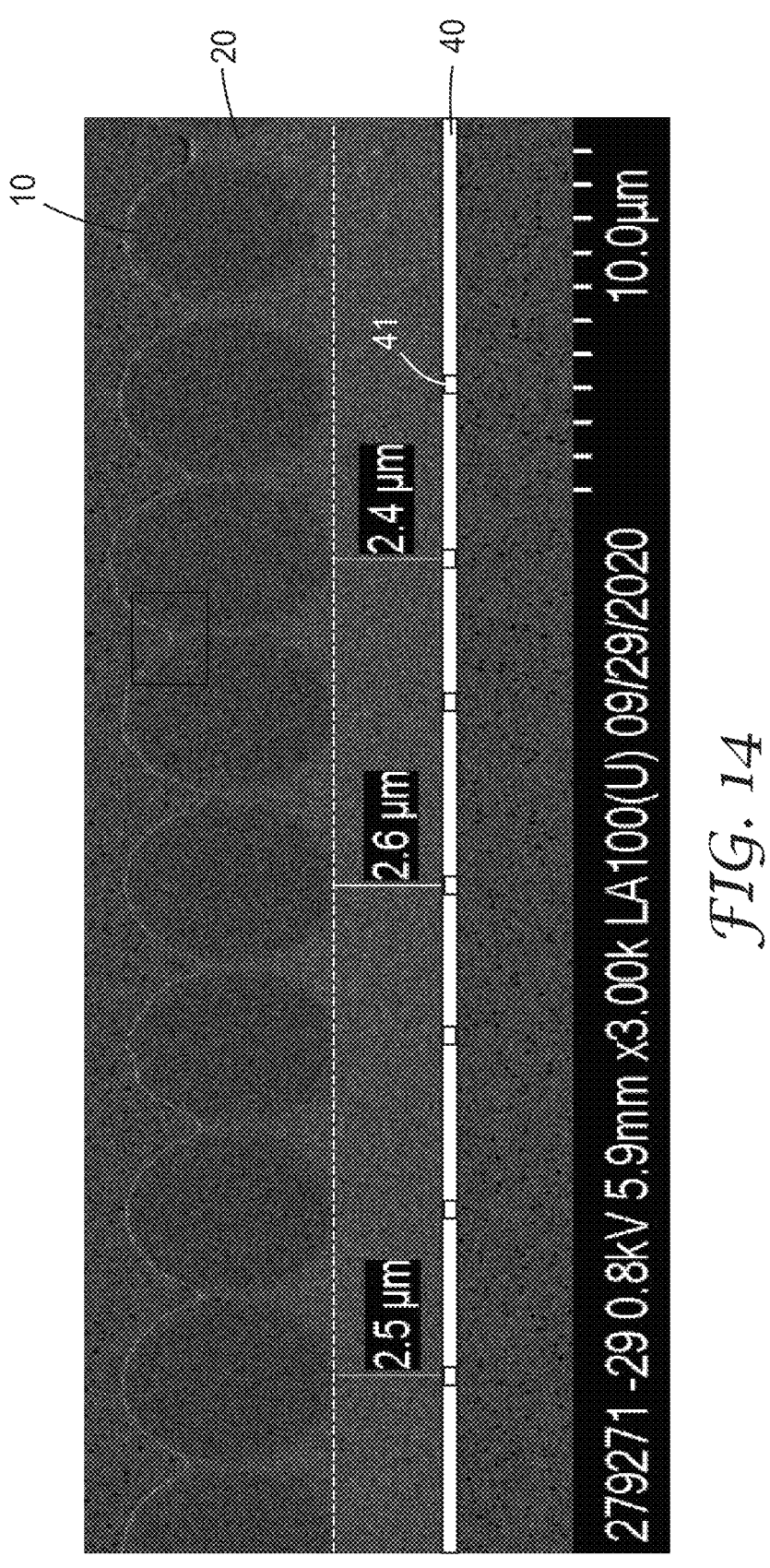
FIG. 14 is a cross-section view of a micrograph of monolayer of optically transparent beads.

FIG. 14 shows a cross-section view of a micrograph of monolayer of optically transparent beads according to some embodiments.

Figure 15:
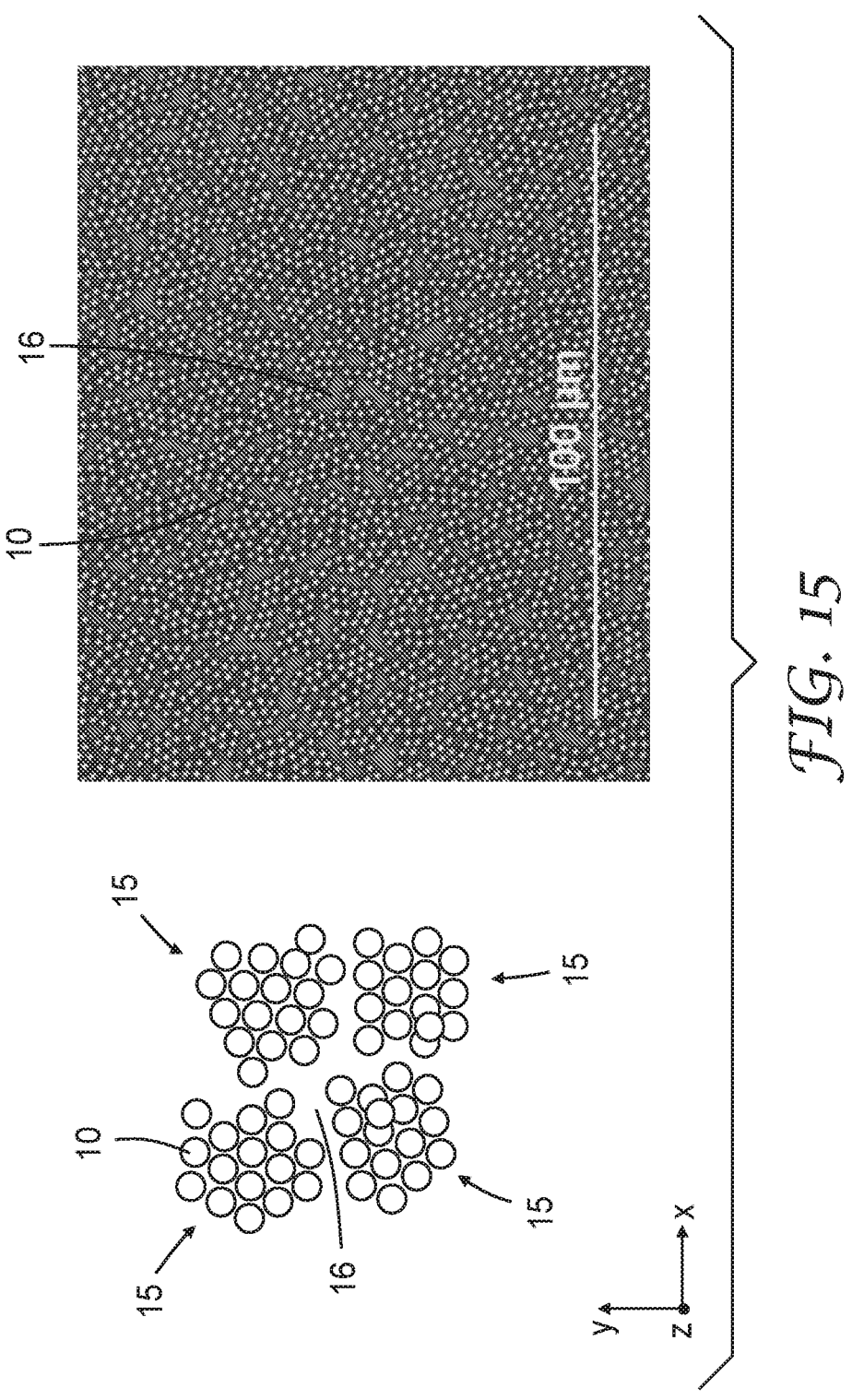
FIG. 15 schematically shows coplanar bead domains with arrays of optically transparent beads according to some embodiments.

As best shown in FIG. 15, the first beads (10) may form a plurality of substantially coplanar structured bead domains (15). Substantially coplanar domains can be coplanar or approximately coplanar but with some minor variation about, or displacements from, a plane such as those that would be expected from ordinary manufacturing variations, for example. Each structured domain (15) may include a substantially regular array of first beads (10) arranged along orthogonal first and second directions (e.g., x- and y-directions). For instance, each of the bead domains (15) may include a substantially regular array of the first beads arranged along orthogonal first (x-axis) and second (y-axis) directions, wherein the arrays of adjacent bead domains (15) may have different orientations.

The substantially coplanar bead domains (15) may be separated by a plurality of void regions (16), wherein the void regions are free or substantially free from the first beads. In some aspects, when viewed from a plan top view, the beads may cover more than about 50%, or more than about 60%, or more than about 70% of a total surface area of the lens film (100). In some aspects, the bead domains may include at least one bead disposed at least partially on top of the remaining first beads. In some embodiments, less than 5%, or less than 4%, or less than 3%, or less than 2%, or less than 1% of the first beads may be disposed at least partially on top of the remaining first beads.

In some aspects, the optically transparent first beads (10) may define a corresponding plurality of protrusions (13) on a major top surface (21) of the first layer (20) facing the display (110). In some aspects, the first layer (20) may be a light absorbing layer, and the plurality of optically transparent first beads (10) may be partially embedded in a light absorbing first layer (20).

According to some configurations, the light blocking second layer (40) may be disposed on the lens film (100) opposite the protrusions (13). In some other aspects, the lens film (100) may include at least one optically transparent second bead (50) that is fully embedded in the first layer. The fully embedded second bead (50) does not define a corresponding protrusion on the major top surface (21) of the first layer (20). In some instances, the at least one optically transparent second bead (50) may be aligned to a through opening (41a) in the plurality of through openings (41) in the light blocking second layer (40). In some other instances, as best seen in FIG. 4, the at least one optically transparent second bead (50) may not be aligned to any through openings in the plurality of through openings (41) in the light blocking second layer (40).

Figure 5:
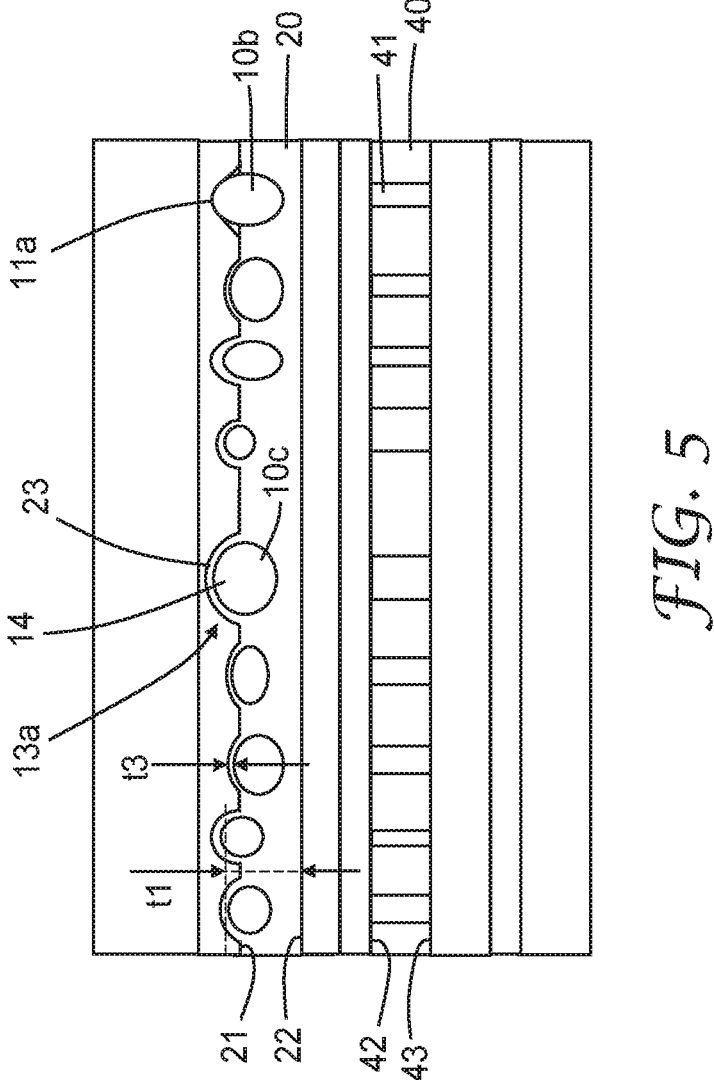
FIGS. 5 & 6 schematically show optical constructions with optically transparent beads according to different embodiments.

As shown in FIG. 5, in some embodiments, for each of at least some of the first beads, at least a top-most portion (11a) of the first bead (10b) may be exposed in the protrusion corresponding to the first bead. In other embodiments, for each of at least some of the first beads, the protrusion (13a) corresponding to the first bead (10c) may include a thin layer portion (23) of the first layer covering substantially an entire protruding portion (14) of the first bead. The first layer (20) may have an average thickness t1 and the thin layer portion (23) may have an average thickness t3. In some instances, $t1/t3 \geq 5$. In other instances, $t1/t3 \geq 10$, or $t1/t3 \geq 20$.

Figure 7:
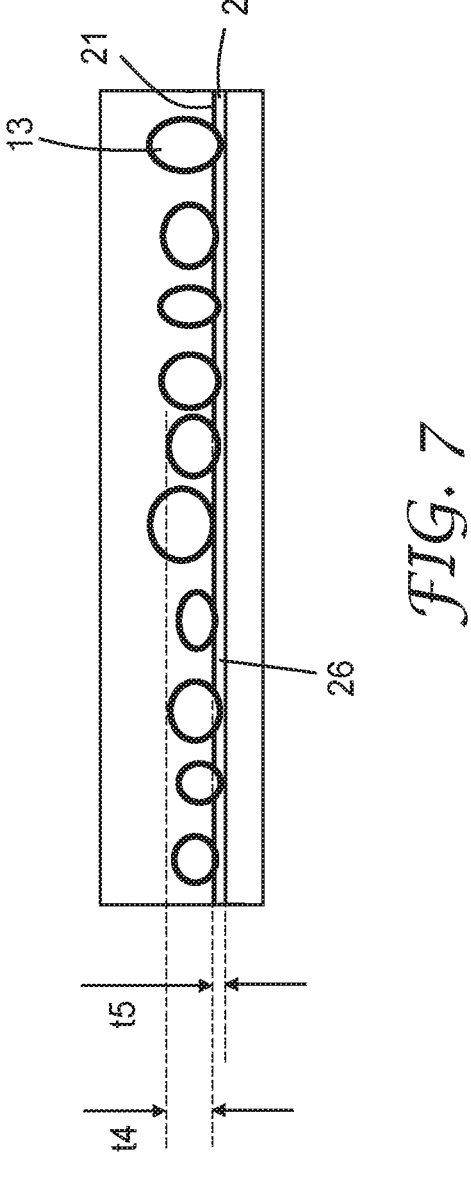
FIG. 7 schematically shows the structure of optically transparent beads in an optical construction according to some embodiments.

According to some embodiments, best seen in FIG. 7, the first layer (20) may define a land region (26) between the protrusions (13). In some aspects, the protrusions (13) may have an average height t4 and the land region (26) may have an average height t5, such that $t4/t5 \geq 2$, or $t4/t5 \geq 5$, or $t4/t5 \geq 10$, or $t4/t5 \geq 20$.

In some aspects, the lens film (100) may include a first substrate layer (60) disposed on the first layer (20) and a second substrate layer (70) disposed on the light blocking second layer (40) opposite the lens film (100), as best seen in FIG. 1. In some aspects, the first substrate layer (60) may absorb at least 50%, or at least 60%, or at least 70% of at least one infrared wavelength between about 650 nm to about 1500 nm. In some aspects, the first substrate layer (60) may include an adhesive.

Figure 2:
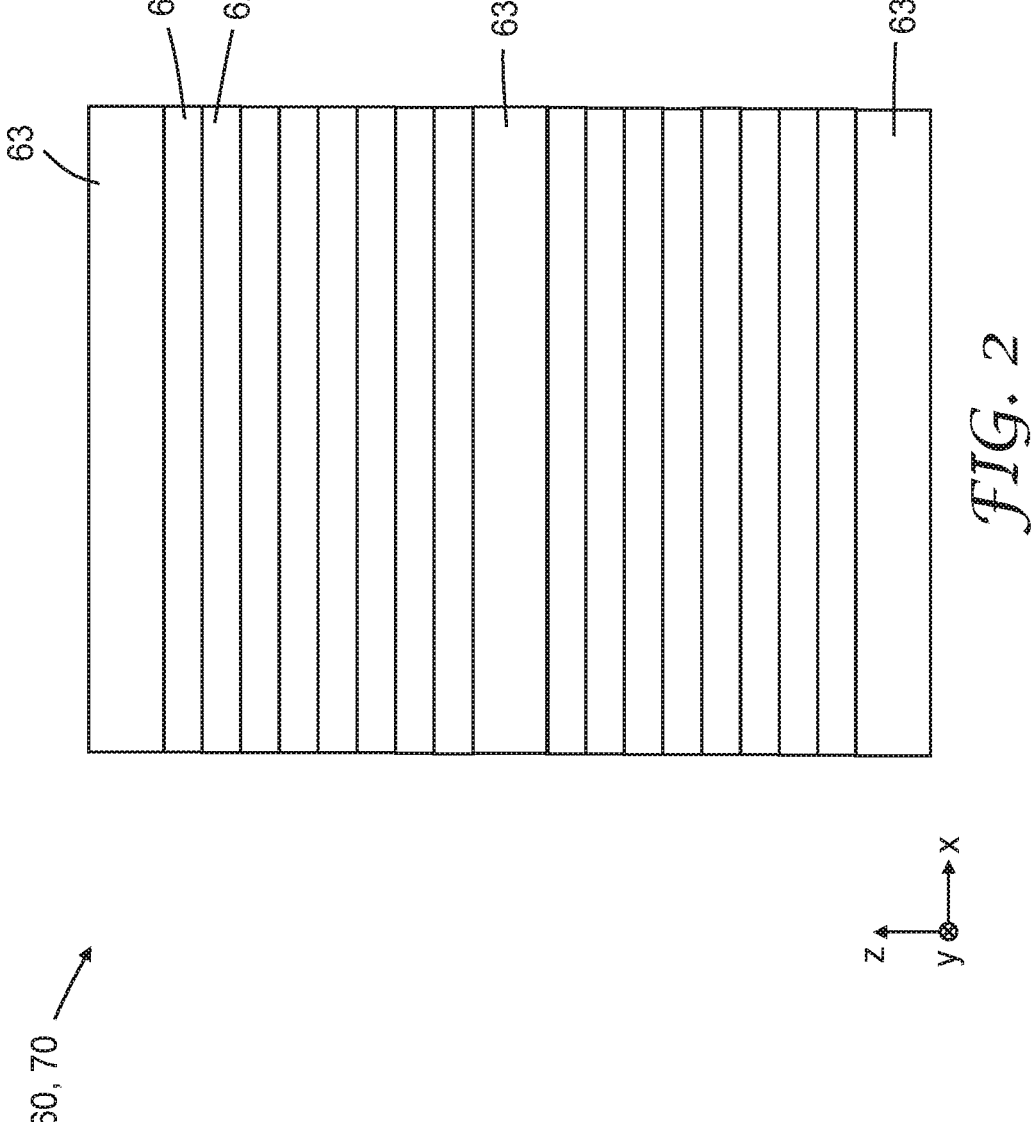
FIG. 2 schematically shows the construction of substrate layers according to some embodiments.

In some aspects, at least one of the first and second substrate layers (60, 70) may include a plurality of polymeric layers (61, 62) as shown in FIG. 2. In some instances, the plurality of polymeric layers (61, 62) may number at least 10 in total. In some instances, the plurality of polymeric layers (61, 62) may number at least 50, or at least 100, or at least 200, or at least 300, or at least 400, or at least 500 in total. Each of the polymeric layers (61, 62) may have an average thickness of less than about 500 nm, or less than about 400 nm, or less than about 200 nm. In some embodiments, the number of layers may be selected to achieve the desired optical properties using the minimum number of layers for reasons of film thickness, flexibility and economy. For instance, at least one of the first and second substrate layers (60, 70) may include fewer than 10 polymeric layers. At least one of the first and second substrate layers (60, 70) may include at least one skin layer (63). The average thickness of the at least one skin layer (63) may be greater than about 500 nm, or, in some instances, greater than 700 nm, or greater than 1 micron.

Multilayer polymeric films generally include alternating first (61) and second (62) polymeric layers including at least one birefringent polymer (e.g. oriented semi-crystalline polymer) and one second polymer. In some aspects, at least one of the first and second substrate layers (60, 70) may be a multilayer stack having alternating first and second optical layers (61, 62) of at least two materials. In one embodiment, the materials of first and second layers (61, 62) may be composed of polymers such as polyesters. For instance, an exemplary polymer useful as a first birefringent layer (61) in at least one of the first and second substrate layers (60, 70) may be polyethylene naphthalate (PEN). Other semicrystalline polyesters suitable as birefringent polymers as the first birefringent layer (61) in the multilayer polymeric film may include, for example, polybutylene 2,6-naphthalate (PBN), polyethylene terephthalate (PET), or the like. The second layer (62) can be made from a variety of polymers having glass transition temperatures compatible with that of the first birefringent polymer layer (61) and having a refractive index similar to the isotropic refractive index of the first birefringent polymer layer (61). Examples of other polymers suitable for use in optical films and, particularly, in the second polymer layer (62) may include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second polymer layer (62) can be formed from homopolymers and copolymers of polyesters, polycarbonates, fluoropolymers, and polydimethylsiloxanes, and blends thereof. The layers can be selected to achieve the reflection of a specific bandwidth of electromagnetic radiation. In one embodiment, the materials of the plurality of layers (61, 62) may have differing indices of refraction. In some embodiments, at least the one of the first and second substrate layers (60, 70) may include PET as the first optical layer (61) and co polymers of PMMA (coPMMA), or any other polymer having low refractive index, including copolyesters, fluorinated polymers or combinations thereof as the second optical layer (62). The transmission and reflection characteristics of the first and second substrate layers (60, 70) may be based on coherent interference of light caused by the refractive index difference between the layers (61, 62) and the thicknesses of layers (61, 62).

In some embodiments, for a substantially normally incident light and for at least one visible wavelength in a visible wavelength range extending from about 420 nm to about 680 nm, the plurality of polymeric layers (61, 62) may reflect at least 60% of the incident light polarized along a first direction (x-axis). In other embodiments, for a substantially normally incident light and for at least one visible wavelength in a visible wavelength range extending from about 420 nm to about 680 nm, the plurality of polymeric layers (61, 62) may transmit at least 60% of the incident light polarized along an orthogonal second direction (y-axis). In some instances, the plurality of polymeric layers (61, 62) may reflect at least 70%, or at least 80%, or at least 85%, or at least 90%, or at least 95%, or greater than about 99% of the incident light polarized along a first direction (x-axis) in the visible wavelength range. In some instances, the plurality of polymeric layers (61, 62) may transmit at least 70%, or at least 80%, or at least 85%, or at least 90%, or at least 95%, or greater than about 99% of the incident light polarized along a second direction (y-axis) in the visible wavelength range.

According to some aspects, for a substantially normally incident light, for each of mutually orthogonal first and second polarization states, the plurality of polymeric layers (61, 62) may transmit at least 60%, or at least 70%, or at least 80%, or greater than 90% of the incident light for at least one visible wavelength in a visible wavelength range extending from about 420 nm to about 680 nm. In other aspects, for the substantially normally incident light, for each of the mutually orthogonal first and second polarization states, and for at least one infrared wavelength in an infrared wavelength range extending from about 750 nm to about 1200 nm, the plurality of polymeric layers (61, 62) may reflects at least 60% or at least 70%, or at least 80%, or greater than 90% of the incident light.

According to some embodiments, for a substantially normally incident light and in the infrared wavelength range, say, for at least one infrared wavelength extending from about 750 nm to about 1200 nm, the plurality of polymeric layers (61, 62) may transmit at least 60%, or at least 70%, or at least 80% of the incident light polarized along each of the first and second directions.

In some embodiments, best seen in FIG. 1, a second bonding layer (150) may bond the display (110) to the optical construction (200). For instance, the second bonding layer (150) may be disposed between the display (110) and the first layer (20) of the optical construction (200). For at least one visible wavelength in a visible wavelength range extending from about 420 nm to about 680 nm, the second bonding layer (150) may have an index of refraction of less than about 1.3. In other aspects, the index of refraction of the second bonding layer (150) for at least one visible wavelength in a visible wavelength range extending from about 420 nm to about 680 nm may be less than about 1.25, or less than about 1.2, or less than about 1.05. In other aspects additional layers of adhesive, sealing or index matching materials may be required in addition to the bonding layer (150).

Figure 8:
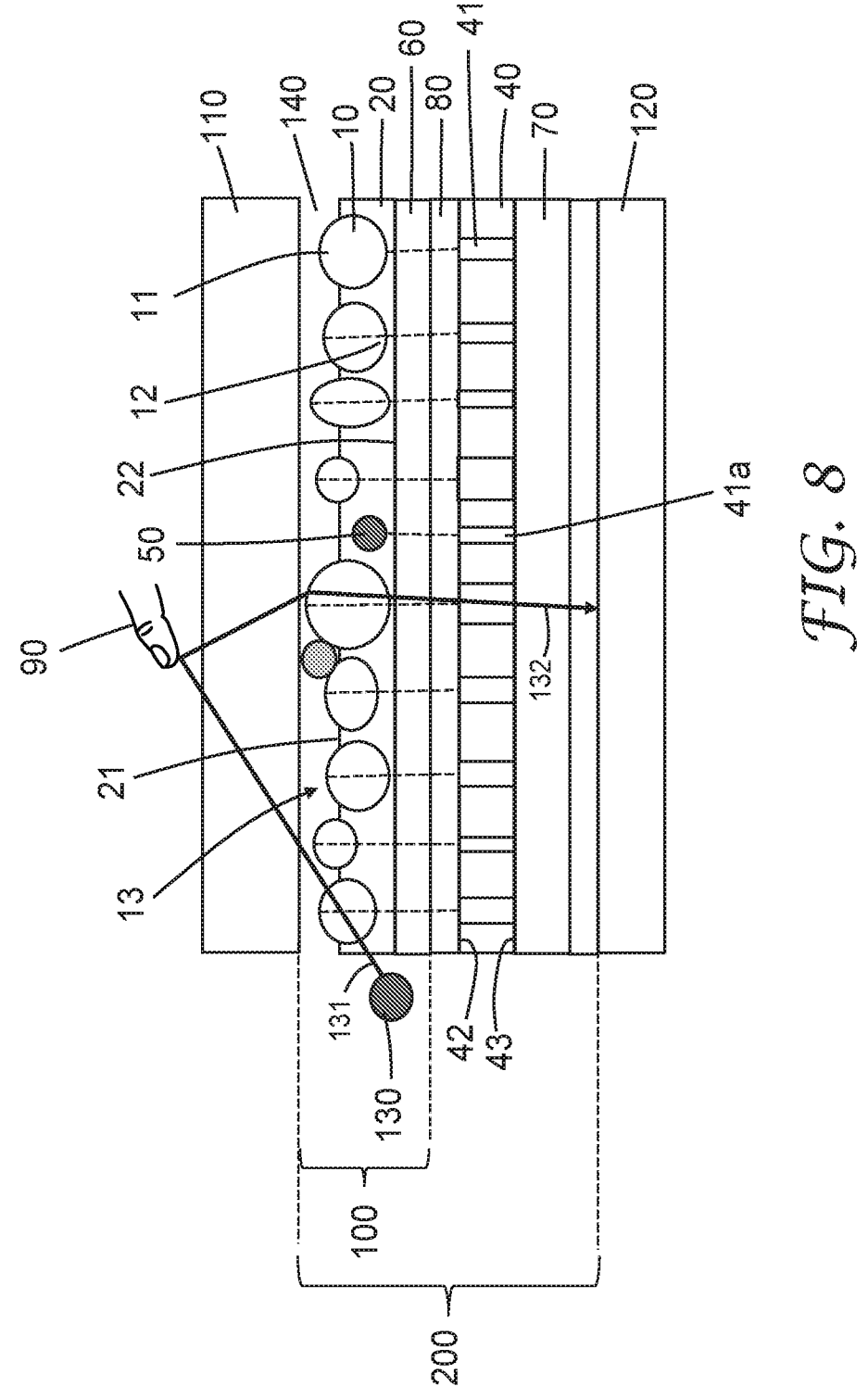
FIG. 8 schematically shows an optical construction according to some other embodiments.

In other embodiments, as best shown in FIG. 8, the display (110) and the optical construction (200) may define an air gap (140) therebetween. The air gap may have a thickness of about 20 microns to about 30 microns.

In some embodiments, the optical system (300) may include a third bonding layer (160) bonding the optical sensor (120) to the optical construction (200). For instance, the third bonding layer (160) may be disposed between the second substrate layer (70) and the optical sensor (120).

In some embodiments, the optical construction (200) may be configured to be bent over a radius of less than about 100 mm with no or little damage to the optical construction (200). In other cases, the optical construction (200) may be configured to be bent over a radius of less than about 80 mm, or 60 mm, or 40 mm, or 20 mm, or 10 mm. In other embodiments, the optical construction (200) may be configured to conform to a sphere of a radius of less than about 200 mm, or less than 150 mm or less than 100 mm or less than 50 mm with no or little damage to the optical construction (200).

FIGS. 11, 11A, 111B and 12, 12A, 12B illustrate some embodiments of an optical construction (200) including a first layer (20) having a plurality of optically transparent first beads (10) at least partially embedded therein and a light blocking second layer (40) defining a plurality of openings (41) therein. In some aspects, the first layer (20) may be optically transparent having an average optical density of less than about 0.5, or less than 0.25, or less than 0.1, or less than 0.05 in a visible wavelength range extending from about 420 nm to about 680 nm. In some other aspects, the first layer (20) may be optically absorbing having an average optical density of greater than about 0.2, or greater than about 0.5, or greater than about 1, or greater than about 1.5, or greater than about 2, or greater than about 2.5, or greater than about 3 in a visible wavelength range extending from about 420 nm to about 680 nm.

The first layer (20) may include opposing major top (21) and bottom (22) surfaces and the light blocking second layer (40) may include opposing major top (42) and bottom (43) surfaces. The first beads (10), in some aspects, include top-most portions (11) and bottom-most portions (12). The top-most portions (11) of the beads face away from the light blocking second layer (40) and the bottom-most portions (12) of the beads face the light blocking second layer (40). In some aspects, the bottom-most portions (12) of the first beads (10) may be disposed at, or proximate to, the major bottom surface (22) of the first layer (20).

The bottom-most portions (12) of the first beads (10) and the major bottom surface (22) of the first layer (20) define a plurality of contact or near contact regions (30) therebetween. In some aspects, at least some of the contact or near contact regions in the plurality of contact or near contact regions (30) may form physical openings formed by removing a portion of the first layer (20) corresponding to the contact or near contact regions (30). In some embodiments, the first layer (20) may have an average thickness t1, and the contact or near contact regions (30) may have an average thickness t2, such that $t1/t2 \geq 3$, or $t1/t2 \geq 5$, or $t1/t2 \geq 7$, or $t1/t2 \geq 10$.

In some aspects, the light blocking second layer (40) may be disposed on the major bottom surface side of the first layer (20) and may define a plurality of through openings (41) therein extending between opposite major top (42) and bottom (43) surfaces of the second layer (40). In some embodiments, the through openings (41) may be aligned to the contact or near contact regions (30) in a one-to-one correspondence.

In some embodiments, an optical system may include a light blocking layer (40) defining a plurality of openings (41) therein. As shown in FIG. 9, for substantially normally incident light (170) having a first wavelength in a predetermined wavelength range, being a visible wavelength range extending from about 420 nm to about 680 nm, a total optical transmittance of the light blocking layer (40) at the openings (41) is T1 and a total optical transmittance of the light blocking layer (40) in regions (44) between the openings (41) is T2, such that $T1/T2 \geq 10$, or $T1/T2 \geq 15$, or $T1/T2 \geq 25$.

In some other embodiments, for substantially collimated substantially normally incident light (170) having a first wavelength in a predetermined wavelength range, being a visible wavelength range extending from about 420 nm to about 680 nm, a total optical transmittance of the beaded film (100) may be Ta when the incident light is incident on the protrusions side of the beaded film (100) and Tb when the incident light is incident on the major bottom surface side of the beaded film (100), such that $Ta/Tb \geq 1.5$, or $Ta/Tb \geq 2$, or $Ta/Tb \geq 5$, or $Ta/Tb \geq 10$, or $Ta/Tb \geq 20$, or $Ta/Tb \geq 50$.

Figure 6:
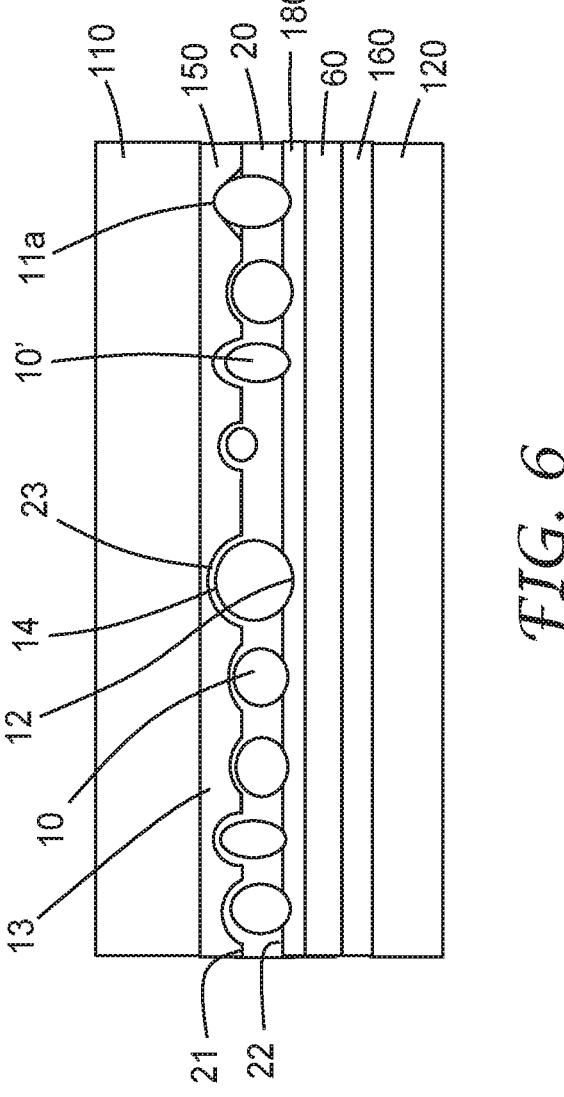

In some embodiments, as best shown in FIG. 6, the beaded film may further include an optically transparent non absorbing second layer (180) disposed on the light absorbing first layer (20) opposite the plurality of protrusions (13). The bottom of at least one of the first beads (10') may be embedded in the second layer (180).

Figures 11, 11A, 11B:
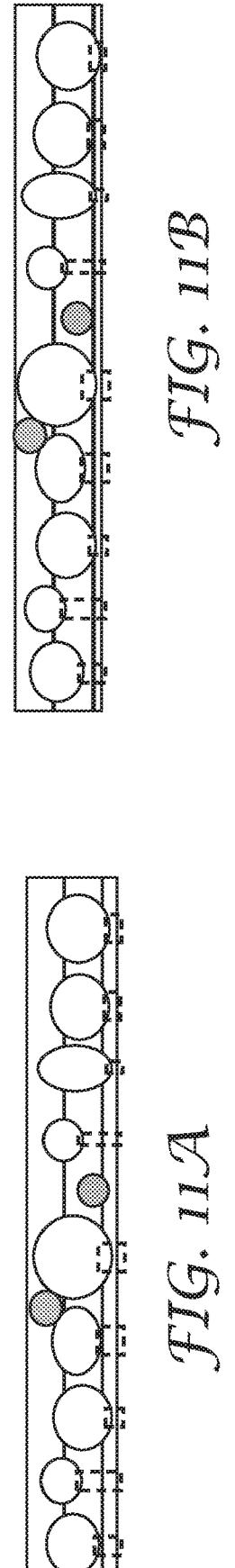
FIG. 11, 11A-11B schematically illustrate the contact or near contact regions of the optically transparent beads of an optical construction according to some embodiments.
Figures 12, 12A, 12B:
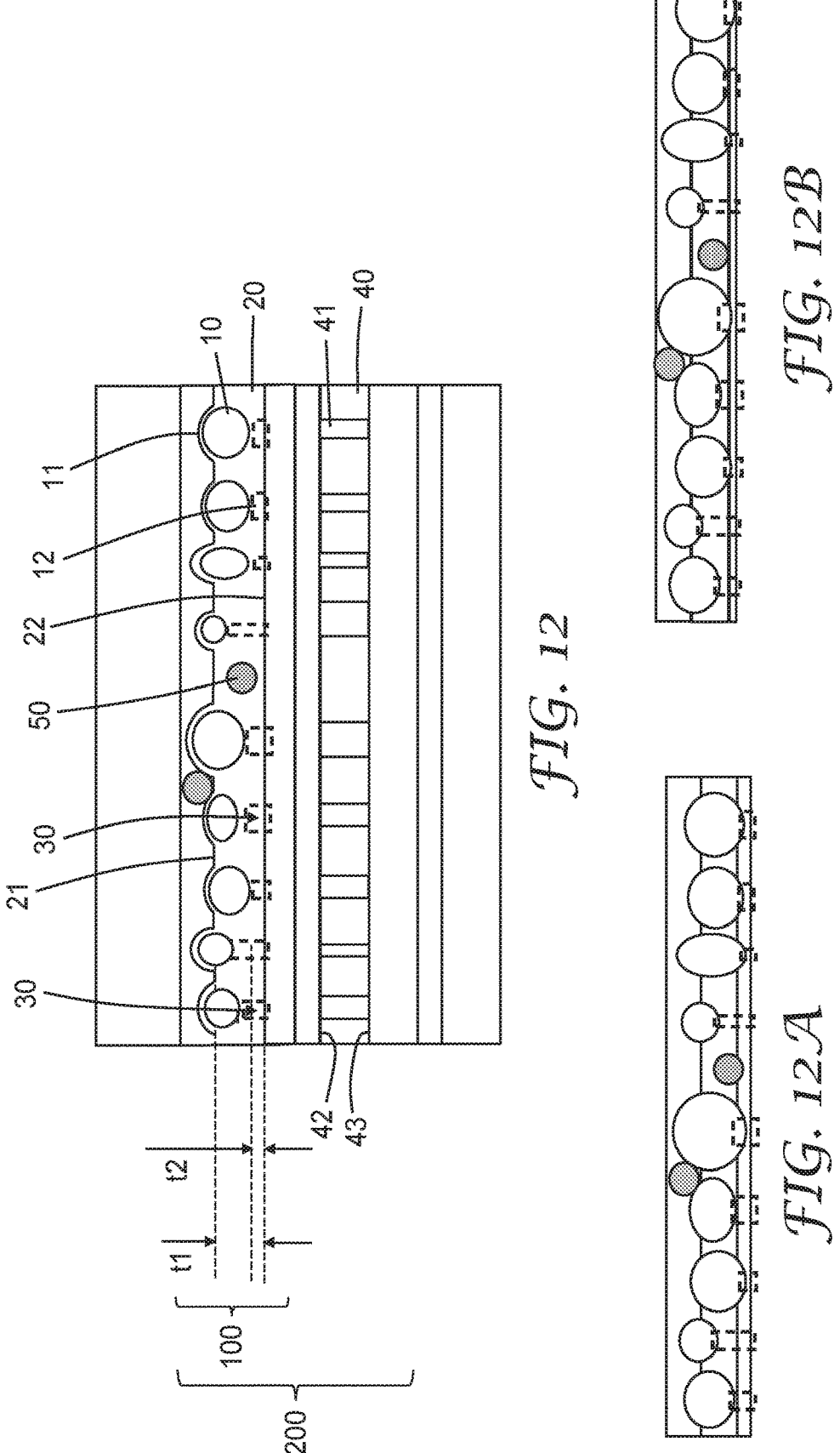
FIG. 12, 12A-12B schematically illustrate the contact or near contact regions of the optically transparent beads of an optical construction according to other embodiments.
Figure 16:
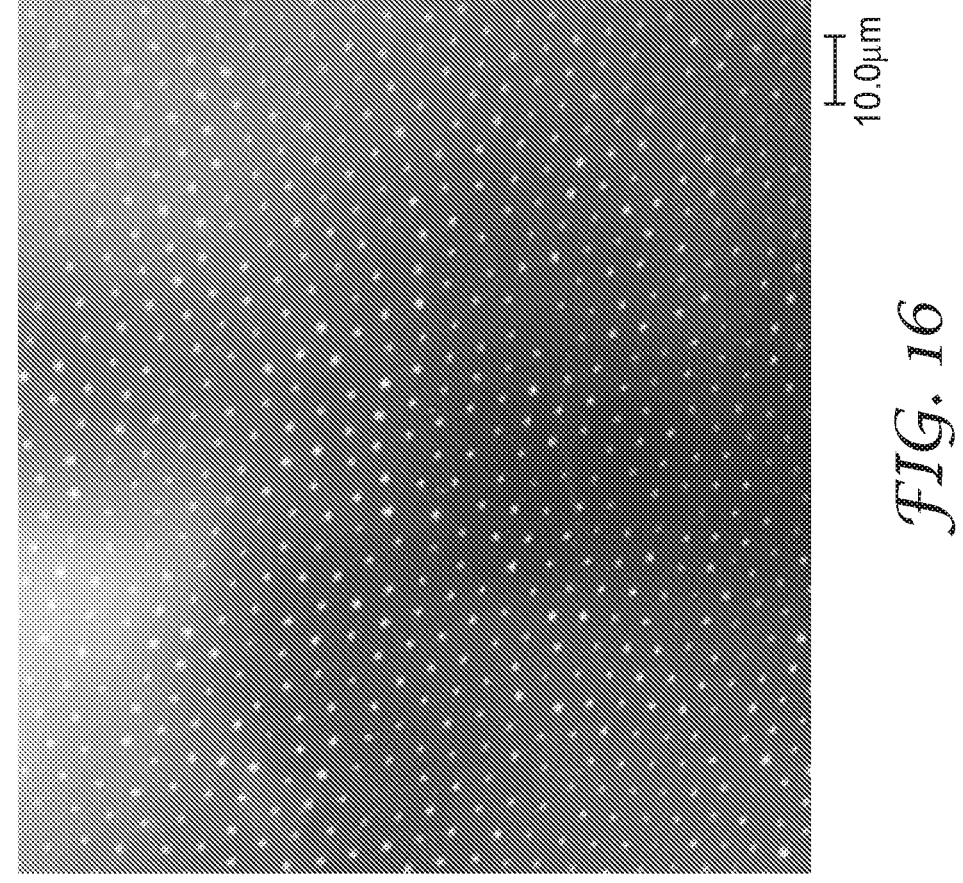
FIG. 16 is a top view of a micrograph of array of openings formed in second, light blocking layer, according to some embodiments.

As shown in FIGS. 1, 8 and 11, a plurality of beads (10) may be arranged substantially in a monolayer of beads along orthogonal first (x-axis) and second (y-axis) in-plane directions of the monolayer of the beads. The monolayer of the beads may be disposed on and spaced apart from the light blocking layer (40). FIG. 16 shows micrograph of self-assembled monolayer beads array according to some embodiments.

The top-most portions (11) of the beads face away from the light blocking second layer (40) and the bottom-most portions (12) of the beads face the light blocking second layer (40). In some aspects, each opening in the plurality of openings (41) may be aligned with the bottom-most portion (12) of a different corresponding bead in the monolayer of the beads along substantially a same first direction (z-axis).

Figure 13:
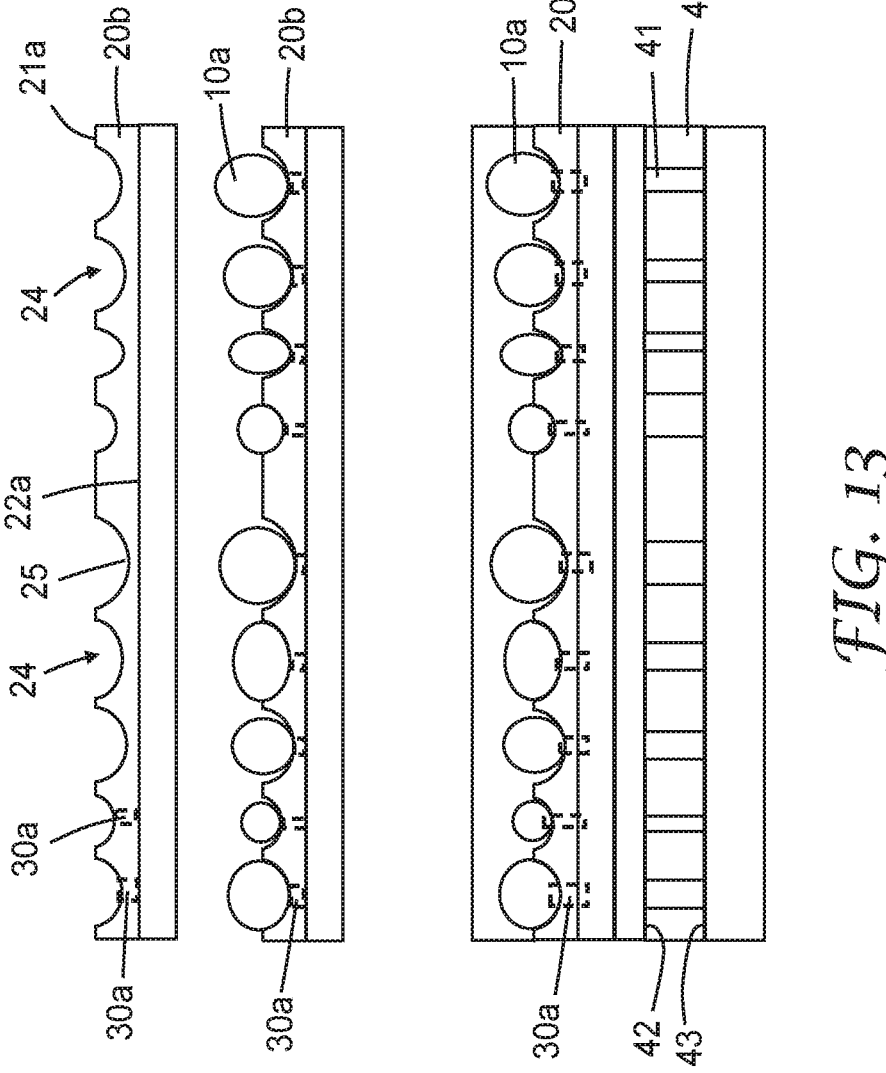
FIG. 13 schematically shows an optical construction according to some other embodiments.

Another embodiment of an optical construction is illustrated in FIG. 13. The optical construction (200a) includes a first layer (20b) having a major top surface (21a) and an opposing major bottom surface (22a). In some embodiments, the major top surface (21a) of the first layer (20b) defines a plurality of depressions (24) therein. The depressions may be configured to receive a plurality of optically transparent corresponding beads. In some aspects, a plurality of optically transparent first beads (10a) may be disposed on the major top surface (21a) of the first layer (20b) in the depressions (24). The dimensions of the first beads (10a) and the depressions (24) may be such that substantially only one of the first beads (10) occupies each of the depressions (24).

The depressions (24) may include bottom-most portions (25). In some aspects, a size of the depressions in the plurality of depressions (24) may vary by less than about 10%, or less than about 8%, or less than about 6%, or less than about 4%, or less than about 2%. The optical construction (200a) further includes a light blocking second layer (40) disposed on the major bottom surface (22a) of the first layer (20b). The light blocking second layer (40) may be disposed opposite the depressions (24). In some aspects, the light blocking second layer (40) may define a plurality of through openings (41) therein. The through openings (41) may be aligned to the depressions (24) in a one-to-one correspondence. In some instances, the bottom-most portions (25) of the depressions and the major bottom surface (22a) of the first layer (20b) may define a plurality of first regions (30a) therebetween. The through openings (41) may be aligned to the first regions (30a) in a one-to-one correspondence.

EXAMPLES

All parts, percentages, ratios, etc. in the Examples and the rest of the specification are by weight, unless noted otherwise.

TABLE 1

Materials Reference
Materials Used in the Examples

| Abbreviation or Trade Designation | Description |
|---|---|
| SR399 LV | Low viscosity dipentaerythritol pentaacrylate obtained under the trade designation "SR399 LV" from Sartomer Americas, Exton, PA |
| SR833S | Difunctional tricyclodecanedimethanol diacrylate obtained under the trade designation "SR833S" from Sartomer Americas, Exton, PA |
| IR 184 | A photoinitiator obtained under the trade designation "IGACURE 184" from BASF Corporation, Tarrytown, NY |
| IPA | Isopropyl alcohol obtained from Aldrich Chemical |
| 1-methoxy-2-propanol | Dow Chemical Company, Midland MI |
| TEGORAD 2250 | Silicone polyether acrylate obtained under the trade designation "TEGORAD 2250" from Evonik Goldschmidt Corp., Hopewell, VA |
| MX-500 | Crosslinked acrylic narrow-dispersion particles obtained under the trade designation "MX-500" from Soken Chemical & Engineering Co., Ltd. |
| SSX-108 | Crosslinked polymethmethacrylate spherical particle obtained under trade designation "SSX-108" from Sekisui Kasei Co., Ltd. |
| Carbon black | Carbon black pigment from Cabot Corporation, Boston, MA |
| IBOA | Isoborneol Acrylate obtained from Sigman-Aldrich, St. Louis, MO |

Variation of Example Types—General Description

The examples include variations of a beaded coating, which includes differing bead diameters and the resin system in which the beads are embedded. The examples also include different light blocking layer optical density. The examples also included differences in the spacer layer, the spacer layer being the layer that separates the beaded coating from the light blocking layer.

The order of operations to prepare these examples begins with coating of the desired light blocking layer onto the substrate, followed by coating of the spacer layer, followed by coating of the beaded microlens array layer.

Preparation of Light Blocking Layers

Light blocking layers were made on polyethylene terephthalate (PET) substrates by vacuum deposition of a thin aluminum layer on the surface the PET. Optical density of the PET substrates with light blocking layer were measured with a Gretag-Macbeth AG D200-II. Our examples include light blocking layers with two different optical densities, namely OD 2.0 and OD 2.55 which will be identified in the example table.

Preparation of Coating Solutions for Spacer Layers

There are 2 variations of spacer layer represented in these examples. Spacer layer type A using SR399LV monomer, Irgacure 184 at 0.99 wt % solids in solvents 1-methoxy-2-propanol/IPA in ratio of 5.66:1. The wt % solids for spacer type A is 30%. Spacer layer type B using SR833S monomer, Irgacure 184 at 0.99 wt % solids in solvents 1-methoxy-2-propanol/IPA in ratio of 5.66:1. The wt % solids for spacer type B is 40%.

Preparation of Coating Solutions for Beaded Microlens Array Layer

Three types of beaded microlens coating solutions are shown in table 2 as beaded solution C, D, E.: In each solution the listed, the monomers, solvents (1-methoxy-2-propanol/IPA at 5.67:1 solvent ratio), IRGACURE 184 photoinitiator (1.0 wt % solids) and TEGORAD 2250 surfactant were mixed together to form a homogenous solution.

Optically transparent beads (MX-500 or SSX-108 with bead diameter of 5 um and 8 um respectively) were then added to the solution and further mixed to again form a homogenous solution with the optically transparent beads. The bead to monomer ratio in each of these solutions was 2.57:1 weight ratio. Beaded solution C was prepared without carbon black and beaded solutions D and E were prepared with different amounts of carbon black based light absorbing monomer mixture added to the homogeneous beaded resin mixture. In each case, the bead addition was followed by additional mixing to form a homogeneous solution.

The carbon black based light absorbing monomer mixture was made in the following manner. The carbon black based light absorbing monomer mixture was a carbon black— IBOA slurry which was made through a media milling process. A dispersant and IBOA were first mixed using a Dispermat CN-10 laboratory high-shear disperser (BYK-Gardner USA, Columbia MD) until fully dissolved, and then carbon black powder was slowly added under mixing. The slurry was composed of 30% wt carbon black, 55% IBOA, and 15% dispersant. The fully mixed slurry was milled using a LabStar laboratory media mill (Netzsch, Exton PA) with 0.5 mm yttria stabilized zirconia milling media. Small amounts of samples were taken out periodically to monitor the milling progress. The fineness of grind of the final slurry was 7.5-8 Hegman unit (or less than 6.5 microns) measured by a Grindometer 100 (BYK Instrument, Columbia MD) as disclosed in ASTM D1210.

For the purpose of quantifying the optical density of resin systems for bead-free finished coating regions, we made a range of calibration samples of differing thickness using a bead coating solution E but without the addition of beads.

TABLE 2

Beaded coating solutions

| Bead Coating Solutions | Monomers | Monomer Ratio | Surfactant | Bead | % Solids |
|---|---|---|---|---|---|
| C | SR399LV | | Tegorad 2250 (0.12 wt % on solution) | MX-500 | 30 |
| D | SR399LV/ carbon black based monomer mixture | 1:1 | Tegorad 2250 (0.12 wt % on solution) | MX-500 | 30 |
| E | SR399LV/ carbon black based monomer mixture | 1:0.33 | Tegorad 2250 (0.018 wt % solution) | SSX-108 | 50 |

General Coating Process

A range of bead-free coatings were coated dried and cured on a clear PET substrate at several thicknesses to measure optical density versus thickness. Optical density was measured with a Gretag-Macbeth AG D200-II on the dry/cured coating on PET. The coating process was as follows: Solution was supplied at a range of specified rates (cc/min) as specified in the table below to a 4 inch (10.2 cm) wide slot type coating die and coated on PET. After the solution was coated on the substrate, the coated web travelled a 10 ft (3 m) span in the room environment, and passed through two 5 ft (1.5 m) long zones of small gap drying with plate temperatures set at 190° F. (88 C). The substrate was moving at a speed (cm/min) specified in the table below to achieve the wet coating thickness specified in Table 3 below. Finally, the dried coating entered a UV chamber equipped with a Fusion System Model I300P where an H-bulb was used. The UV chamber was purged by nitrogen at a flow rate of 11 scfm (310 liters/min) which resulted in an oxygen concentration of approximately 50 ppm.

TABLE 3

| Light absorbing monomer mixture optical density - coating process for calibration solution | | | | |
|---|---|---|---|---|
| Coating Flow Rate (cc/min) | Coating Web Speed (cm/min) | Coating Width (cm) | Calculated Wet Coating Thickness (micron) | Dry Coating thickness (micron) |
| 1.31 to 5.24 | 304.8 | 10.16 | 4.23 to 16.92 | 0.5 to 2.0 |

The measured optical density of the coated dried and cured light absorbing monomer mixture versus dried and cured coating thicknesses between 0.5 microns and 2 microns thick resulted in a linear fit with OD=0.797× Thickness [microns]+0.02.

Spacer Layer Coating:

Clear spacer layer coatings were coated, dried, cured on the aluminum deposited surface of light blocking substrates using either type A or B spacer layer coating solutions. The spacer layer coatings were made to target either 2 or 3 micron thickness after coating, drying, and curing. The coating process was as described in general coating process above. Coatings were made at the specified rates as specified in Table 4 below.

TABLE 4

| Example 1D, 2D, 3D - Substrate layer coating process conditions | | | | | | | |
|---|---|---|---|---|---|---|---|
| Spacer Layer coatings [SLC] | Light Blocking Layer | Spacer Coating solution | Coating Flow Rate (cc/min) | Coating Web Speed (cm/min) | Coating Width (cm) | Calculated Wet Coating Thickness (micron) | Dry Coating thickness (micron) |
| SLC1 | 2.0 OD | A | 2 | 304.8 | 10.16 | 6.46 | 2 |
| SLC2 | 2.55 OD | B | 1.46 | 304.8 | 7.62 | 6.29 | 2 |
| SLC3 | 2.55 OD | B | 2.25 | 304.8 | 7.62 | 9.69 | 3 |

Beaded Microlens Array Layer Coating Process

Beaded microlens solutions with and without a carbon black based light absorbing monomer mixture from bead coating solutions C, D, E were coated, dried, and cured on Spacer Layer coatings (SLC1-3). As a comparative example (CE1), a bead microlens array layer was coated directly on a polyethylene terephthalate (PET) film; this bead microlens array layer is equivalent to type E. The coating process was as described in general coating process. These coatings were made as specified in Table 5 below generating beaded microlens array layers and CE1.

TABLE 5

| Beaded Array Layer coating process conditions | | | | | | |
|---|---|---|---|---|---|---|
| Bead Array Layer [BAL] | Spacer Layer Coating | Coating solution | Coating Flow Rate (cc/min) | Coating Web Speed (cm/min) | Coating Width (cm) | Calculated Wet Coating Thickness (micron) |
| BAL1 | SLC1 | C | 4.3 | 304.8 | 10.16 | 13.89 |
| BAL2 | SLC2 | D | 3.35 | 304.8 | 7.62 | 14.42 |
| BAL3 | SLC3 | E | 3.55 | 304.8 | 7.62 | 15.28 |
| CE1 | PET only | E | 4.5 | 304.8 | 10.16 | 14.53 |

The coating, drying, curing of the beaded microlens solutions generated closely packed monolayer bead coatings on the substrates with near full hemisphere bead protrusions such as shown in the cross-section view micrograph in FIG. 14. Given approximately half of the top portions of the monolayer beads are protruding, it can be estimated that the bottom half of the beads are embedded in the cured monomer layer component with the bottom most tip of the beads in near contact with the substrate. An estimate of the optical density through the non-bead areas in the monolayer coating itself in the direction perpendicular to the plane of the substrate can then be calculated for monolayer bead coatings with light absorbing monomer mixtures using the prior optical density vs. caliper plot result, where film OD=0.797× Thickness [microns]+0.02. Using this result, we adjusted for the ratio of SR399 to carbon black based monomer mixture used in the beaded coating solution taken from Table 2.

Samples BAL1, BAL2 and BAL3 were laser ablated to create an array of openings in the thin aluminum light blocking layer using a laser system comparable to the system described in PCT Publication No. WO 2020/035768 to Biyiki et al. and entitled OPTICAL ELEMENT INCLUDING MICROLENS ARRAY. The resulting laser ablated samples constitute the 3 examples for this invention.

Angular Transmission Measurement

Angular light transmission of Examples 1-3 and CE1 was subsequently measured on these. The microlens samples were measured on a customized goniometer system, consisting of a collimated light source and a silicon detector. The light source was a green LED with 530 nm emission wavelength attached to a collimation lens, both from Thorlabs. The light source was stationary and has a fixed illumination angle. The silicon detector had a light-sensitive area of 20 mm×20 mm, also purchased from Thorlabs. After the microlens sample was clamped to the silicon detector with the microlens coating facing away from the detector and light blocking layer toward the detector, it was rotated with the silicon detector along two orthogonal axis, and the angular transmission of the sample was calculated based on the measured power transmission. The angular transmission curves for the samples were represented by a primary peak centered around the zero degree angle. Cross-talk is defined as signal or transmission leakage outside of this primary peak. $T(0)$ is defined as peak transmission at zero degree.

Figure 17:
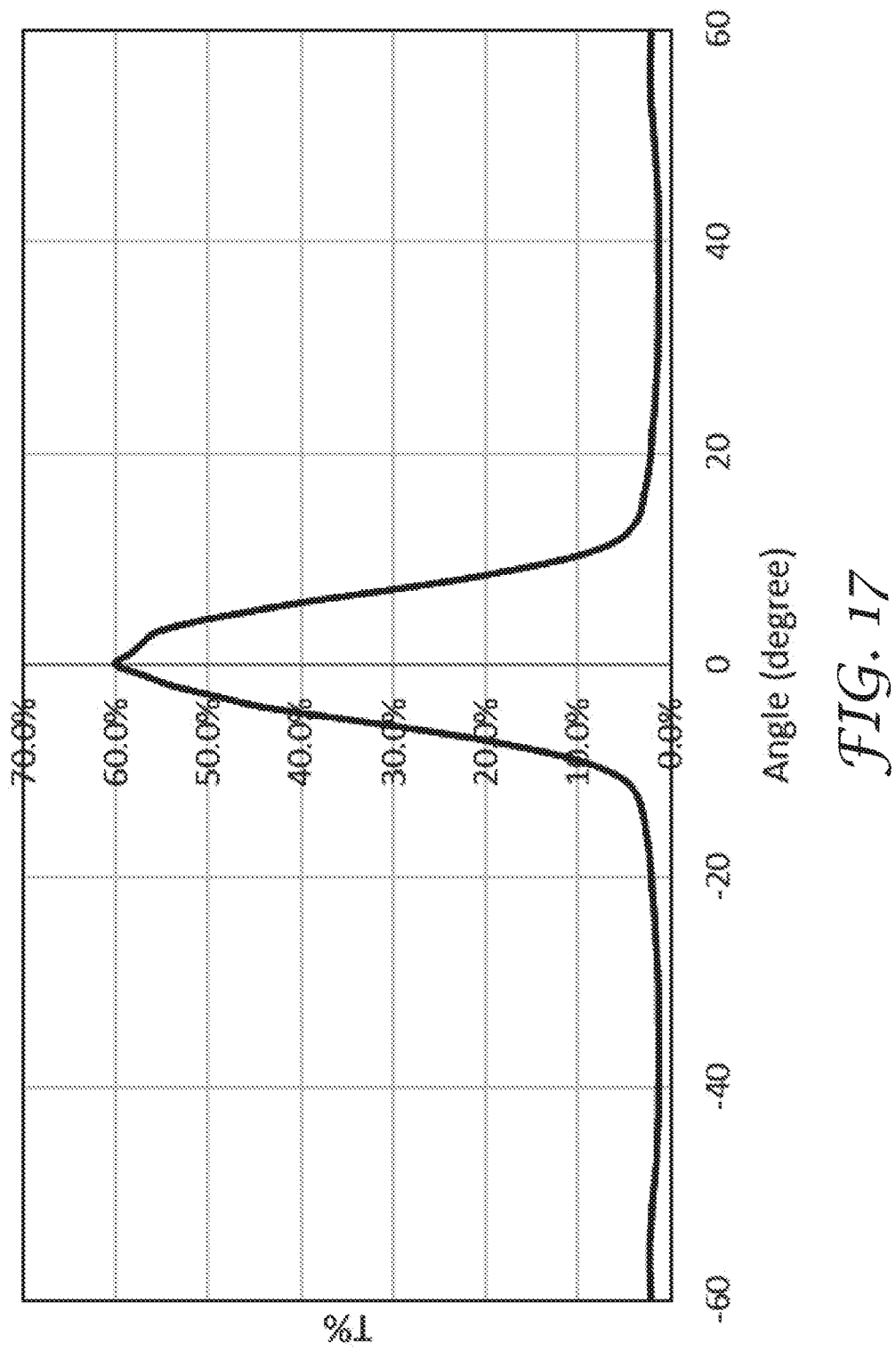
FIGS. 17-20 graphically represent the angular light transmission of different examples of beaded films according to the disclosure.

FIG. 17 shows the angular transmission of Example 1: $T(0)$=60%, Full width half max (FWHM)=13 degree, cross-talk=2.3% at ~+/−55 degree.

Figure 18:
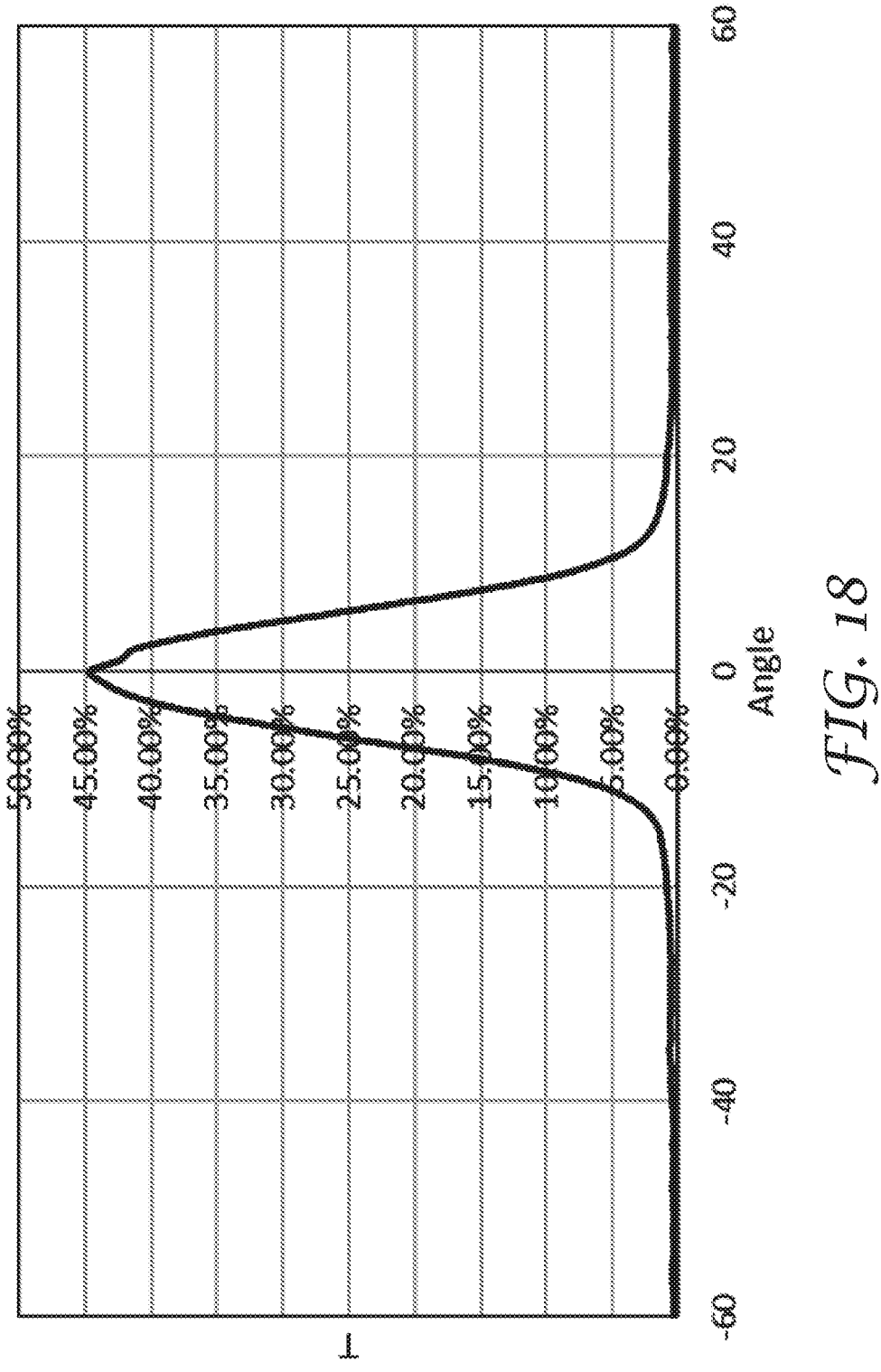

FIG. 18 shows the angular transmission of Example 2: $T(0)$=45%, Full width half max (FWHM)=13 degree, cross-talk is non-detectable.

Figure 19:
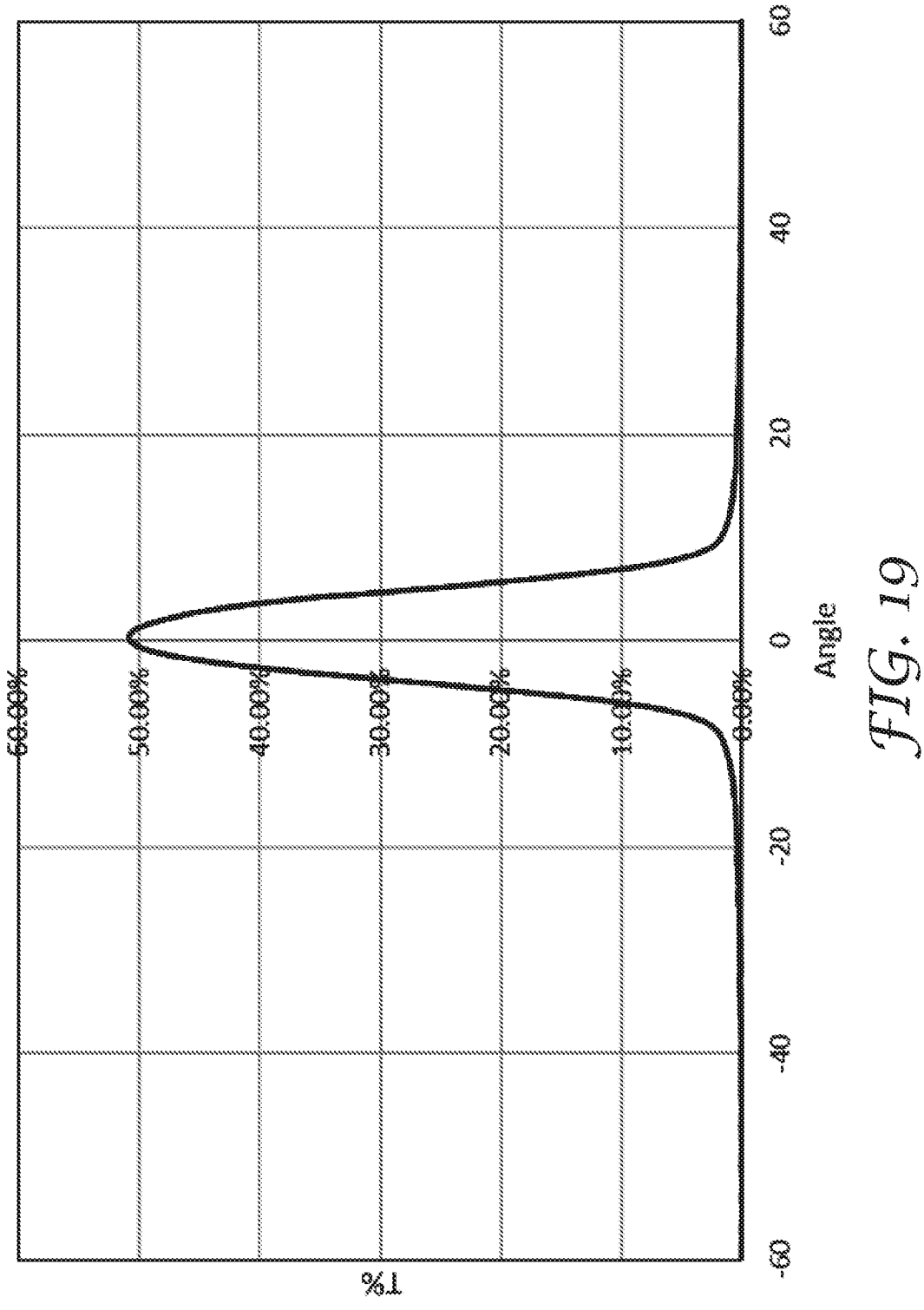

FIG. 19 shows the angular transmission of Example 3: $T(0)$=51%, Full width half max (FWHM)=10 degree, cross-talk is non-detectable.

Figure 20:
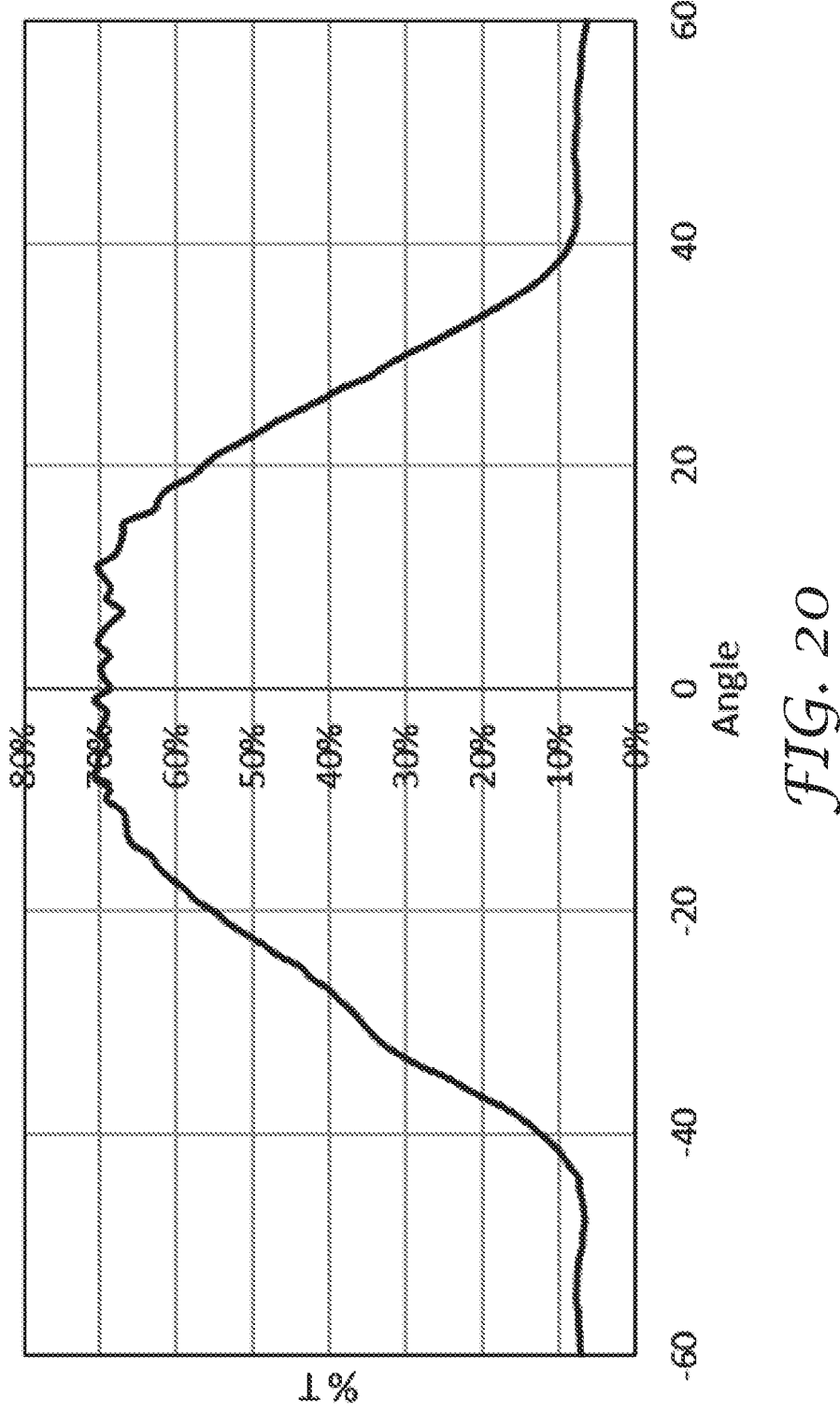

FIG. 20 shows the angular transmission of Example CE1: $T(0)$=70%, Full width half max (FWHM)=59 degree, cross-talk=8% at ~+/−52 degree.

TABLE 6

| | | Summary angular transmission data and descriptions of Examples | | | | | |
|---|---|---|---|---|---|---|---|
| Ex. | Description | Monolayer bead diameter (micron) | Calculated optical density through non-bead area in monolayer bead coating | Optical density of light blocking layer | T(0): Primary peak transmission at 0 deg | FWHM of primary peak | Crosstalk: Transmission leakage outside of primary peak |
| 1 | 5 micron beaded microlens coating with clear monomer with laser ablated light blocking layer | 5 | 0 | 2.00 | 60% | 13 degree | 2.3% |

TABLE 6-continued

Summary angular transmission data and descriptions of Examples

| Ex. | Description | Monolayer bead diameter (micron) | Calculated optical density through non-bead area in monolayer bead coating | Optical density of light blocking layer | T(0): Primary peak transmission at 0 deg | FWHM of primary peak | Crosstalk: Transmission leakage outside of primary peak |
|---|---|---|---|---|---|---|---|
| 2 | 5 micron beaded microlens coating with light absorbing monomer mixture with laser ablated light blocking layer | 5 | 4 | 2.55 | 45% | 13 degree | non-detectable |
| 3 | 8 micron beaded microlens coating with light absorbing monomer mixture with laser ablated light blocking layer | 8 | 3.2 | 2.55 | 51% | 10 degree | non-detectable |
| CE1 | 8 micron beaded microlens coating with light absorbing monomer mixture and no light blocking layer | 8 | 3.2 | none | 70% | 59 degree | 8% |

In some cases, an optical construction includes a first optically absorbing layer that absorbs at least 30%, or 40%, or 50%, or 60%, or 70%, or 80%, or even 90% of an incident light having a wavelength in a visible wavelength range from about 420 nm to about 680 nm. The first optically absorbing layer includes a plurality of optically transparent substantially spherical beads partially embedded therein and partially projecting out from the top surface of the first optically absorbing layer. For example, on an average, 40%, or 45%, or 50%, or 55%, or 60% of the beads are embedded in the first layer and the remaining portions of the beads project out of the first layer. The substantially spherical beads have an index of refraction of between about 1.38 and about 2.0 at at least one wavelength in the visible wavelength range. The at least one wavelength may be a blue wavelength, or a green wavelength, or a red wavelength. In some cases, the index may be 1.38. In some cases, the index may be about 1.5, or about 1.6, or about 1.7, or about 1.8. In some cases, the at least one wavelength is about 633 nm. The optical construction further includes a second optically light absorbing layer that is disposed on the first optically absorbing layer and has an average thickness of between about 0.1 microns and about 3 microns, or between about 0.5 microns and about 2.5 microns, or between about 0.5 microns and about 2 microns. The second optically light absorbing layer defines a plurality of through openings therein that extend between opposite major top and bottom surfaces of the second layers. The through openings are aligned to the first beads in a one-to-one correspondence. For example, the through openings may be formed by laser ablation using a laser beam that is incident on the beads, each of the beads focusing the incident laser and ablating a corresponding through opening in the second layer. The separation between the first and second optically light absorbing layers is less than about 7 microns, or less than about 6 microns, or less than about 5 microns, or less than about 4 microns, or less than about 3 microns, or less than about 2 microns, or less than about 1 microns. In some cases, the separation is zero.

The invention claimed is:

1. An optical construction comprising:
a lens film comprising a plurality of optically transparent first beads (10) at least partially embedded in a first layer; and
a light blocking second layer disposed on the lens film and defining a plurality of through openings therein extending at least partially between opposite major top and bottom surfaces of the second layer, the through openings aligned to the first beads in a one-to-one correspondence, wherein the first beads define a corresponding plurality of protrusions on a major top surface of the first layer; and for each of at least some of the first beads, the protrusion corresponding to the first bead comprises a thin layer portion of the first layer covering substantially an entire protruding portion of the first bead.

2. The optical construction of claim 1, wherein the first layer is optically transparent having an average optical density of less than about 0.5 in a visible wavelength range extending from about 420 nm to about 680 nm.

3. The optical construction of claim 1, wherein the first layer is optically absorbing having an average optical density of greater than about 0.5 in a visible wavelength range extending from about 420 nm to about 680 nm.

4. An optical system configured to sense a presence of a finger of a user of the optical system, the optical system comprising:
the optical construction of claim 1;
a display configured to display an image for viewing by the user and disposed on the lens film side of the optical construction; and
an optical sensor configured to detect light reflected by the finger of the user and disposed on the second layer side of the optical construction.

5. An optical construction comprising:
a first optically absorbing layer comprising a plurality of optically transparent substantially spherical beads partially embedded therein and partially projecting out from a top surface thereof, the substantially spherical beads having an index of refraction of between about 1.38 and about 2.0 at at least one wavelength in a visible wavelength range extending from about 420 nm to about 680 nm; and a second optically light absorbing layer disposed on the first optically absorbing layer and having an average thickness of between about 0.1 microns and about 3 microns, the second optically light absorbing layer defining a plurality of through openings therein extending between opposite major top and bottom surfaces thereof, the through openings aligned to the first beads in a one-to-one correspondence, such that a separation between the first and second optically light absorbing layers is less than about 7 microns.

\* \* \* \* \*